US009256451B2

(12) United States Patent
Cooper

(10) Patent No.: US 9,256,451 B2
(45) Date of Patent: Feb. 9, 2016

(54) EMULATION TIME CORRECTION

(75) Inventor: John Cooper, Mason, NH (US)

(73) Assignee: Oracle International Corporation, Redwood Shores, CA (US)

(*) Notice: Subject to any disclaimer, the term of this patent is extended or adjusted under 35 U.S.C. 154(b) by 628 days.

(21) Appl. No.: 13/538,538

(22) Filed: Jun. 29, 2012

(65) Prior Publication Data

US 2014/0006002 A1 Jan. 2, 2014

(51) Int. Cl.
*G06F 9/455* (2006.01)
*G06F 1/14* (2006.01)

(52) U.S. Cl.
CPC . *G06F 9/455* (2013.01); *G06F 1/14* (2013.01)

(58) Field of Classification Search
USPC .......................... 703/26, 17, 22; 712/229, 233
See application file for complete search history.

(56) References Cited

U.S. PATENT DOCUMENTS

| | | | | | |
|---|---|---|---|---|---|
| 5,896,522 | A | * | 4/1999 | Ward et al. | 703/23 |
| 6,230,114 | B1 | * | 5/2001 | Hellestrand et al. | 703/13 |
| 6,763,328 | B1 | * | 7/2004 | Egolf et al. | 703/27 |
| 7,506,321 | B1 | * | 3/2009 | Irving et al. | 717/138 |
| 7,590,982 | B1 | * | 9/2009 | Weissman | 718/1 |
| 8,271,996 | B1 | * | 9/2012 | Gould et al. | 719/312 |
| 8,473,724 | B1 | * | 6/2013 | Kenville et al. | 712/229 |
| 8,521,499 | B1 | * | 8/2013 | Rompaey et al. | 703/13 |
| 8,543,367 | B1 | * | 9/2013 | Van Rompaey et al. | 703/14 |
| 2002/0019969 | A1 | * | 2/2002 | Hellestrand et al. | 716/5 |
| 2002/0073129 | A1 | * | 6/2002 | Wang et al. | 709/102 |
| 2004/0034852 | A1 | * | 2/2004 | Nakashima | 717/161 |
| 2006/0031838 | A1 | * | 2/2006 | Chrabieh | 718/100 |
| 2006/0265574 | A1 | * | 11/2006 | Agarwala et al. | 712/227 |
| 2007/0192079 | A1 | * | 8/2007 | Rompaey et al. | 703/19 |
| 2008/0091923 | A1 | * | 4/2008 | Fulton et al. | 712/211 |
| 2008/0216073 | A1 | * | 9/2008 | Yates et al. | 718/100 |
| 2008/0244506 | A1 | * | 10/2008 | Killian et al. | 717/100 |
| 2008/0282241 | A1 | * | 11/2008 | Dong | 718/1 |
| 2008/0294413 | A1 | * | 11/2008 | Bobok et al. | 703/16 |
| 2009/0037161 | A1 | * | 2/2009 | Agarwal et al. | 703/17 |
| 2009/0094015 | A1 | * | 4/2009 | Irving et al. | 703/26 |
| 2009/0112552 | A1 | * | 4/2009 | Behm et al. | 703/14 |
| 2010/0057427 | A1 | * | 3/2010 | Walker | 703/17 |
| 2011/0107342 | A1 | * | 5/2011 | Dodge et al. | 718/103 |
| 2012/0089822 | A1 | * | 4/2012 | Nakayama et al. | 712/233 |
| 2012/0272243 | A1 | * | 10/2012 | Nolterieke et al. | 718/1 |

OTHER PUBLICATIONS

K. H. Hoppe, "Instruction Timing Technique for Systems with Overlapped Instruction Execution," An IP.com Prior Art Database Technical Disclosure, Feb. 22, 2005.*

* cited by examiner

*Primary Examiner* — Thai Phan
(74) *Attorney, Agent, or Firm* — Osha · Liang LLP

(57) ABSTRACT

A method for time correction during an emulation of a native computing environment (NCE), including: obtaining, by an emulator, a code segment for execution within the NCE; identifying, during an execution of the code segment within the emulation, a first instance of a time sensitive (TS) instruction; initiating a first instruction sequence window (ISW) in response to identifying the first instance of the TS instruction; identifying, during the execution of the code segment within the emulation, a second instance of the TS instruction after initiating the first ISW; obtaining, in response to identifying the second instance during the first ISW, an expected time between execution of the first instance and the second instance of the TS instruction in the NCE; and inserting an aggregated delay based on the expected time during the execution of the code segment within the emulation.

20 Claims, 7 Drawing Sheets

Cycle Count Table
425

TN Instruction A: 2 cycles in NCE
TN Instruction B: 5 cycles in NCE
TN Instruction C: 3 cycles in NCE
TN Instruction D: 1 cycle in NCE

FIG. 4B

EMULATION TIME CORRECTION

BACKGROUND

In computing, an emulator is hardware or software or both that duplicates (or emulates) the functions of a first computer system (the native computing environment (NCE)) in a different second computer system (host computing device), so that the emulated behavior closely resembles the behavior of the real system. This focus on reproduction of behavior is in contrast to some other forms of computer simulation, in which an abstract model of a system is being simulated.

SUMMARY

In general, in one aspect, the invention relates to a method for time correction during an emulation of a native computing environment (NCE). The method comprises: obtaining, by an emulator, a code segment for execution within the NCE; identifying, during an execution of the code segment within the emulation, a first instance of a time sensitive (TS) instruction; initiating a first instruction sequence window (ISW) in response to identifying the first instance of the TS instruction; identifying, during the execution of the code segment within the emulation, a second instance of the TS instruction after initiating the first ISW; obtaining, in response to identifying the second instance during the first ISW, an expected time between execution of the first instance and the second instance of the TS instruction in the NCE; and inserting an aggregated delay based on the expected time during the execution of the code segment within the emulation.

In general, in one aspect, the invention relates to a non-transitory computer readable medium (CRM) storing instructions for time correction during an emulation of a native computing environment (NCE). The instructions comprise functionality for: obtaining, using an emulator, a code segment for execution within the NCE; identifying, during an execution of the code segment within the emulation, a first instance of a time sensitive (TS) instruction; initiating a first instruction sequence window (ISW) in response to identifying the first instance of the TS instruction; identifying, during the execution of the code segment within the emulation, a second instance of the TS instruction after initiating the first ISW; obtaining, in response to identifying the second instance during the first ISW, an expected time between execution of the first instance and the second instance of the TS instruction in the NCE; and inserting an aggregated delay based on the expected time during the execution of the code segment within the emulation.

In general, in one aspect, the invention relates to a system for time correction during an emulation of a native computing environment (NCE). The system includes: a processor; a code segment for execution within the NCE and comprising a time sensitive (TS) instruction, a first time neutral (TN) instruction, and a second TN instruction; a window manager configured to: initiate a first instruction sequence window (ISW) corresponding to a first instance of the TS instruction during an execution of the code segment within the emulation; and initiate a second ISW corresponding to a second instance of the TS instruction during the execution of the code segment within the emulation; and a timing engine, executing on the processor, and configured to: obtain an expected time between execution of the first instance of the TS instruction and the second instance of the TS instruction in the NCE; and insert, during the execution of the code segment within the emulation, an aggregated delay based on the expected time.

Other aspects of the invention will be apparent from the following description and the appended claims.

BRIEF DESCRIPTION OF DRAWINGS

FIG. 4A, FIG. 4B, and FIG. 4C show an example in accordance with one or more embodiments of the invention.

DETAILED DESCRIPTION

Figure 1:
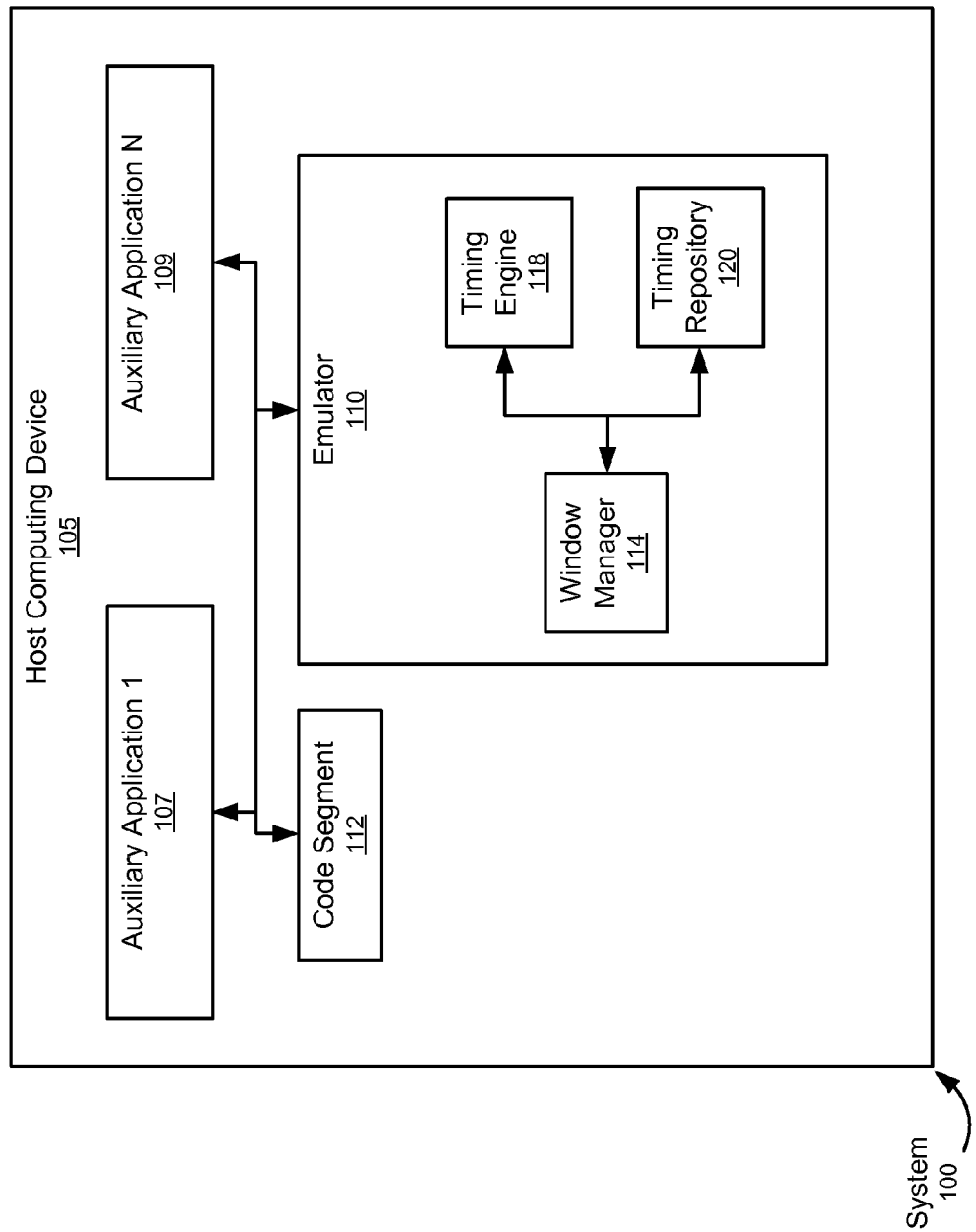
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for emulation time correction. During the execution of a code segment within an emulation of the NCE, time sensitive (TS) instructions are identified by the emulator and one or more delays are deliberately inserted into the emulation. These delays maintain the expected time requirements between the executions of consecutive instances of TS instructions.

FIG. 1 shows a system (100) in accordance with one or more embodiments of the invention. As shown in FIG. 1, the system (100) includes a host computing device (105) having a code segment (112), one or more auxiliary applications (i.e., Auxiliary Application 1 (107), Auxiliary Application N (109)) and an emulator (110). The host computing device (105) may correspond to a desktop personal computer (PC), a laptop, a smart phone, a tablet, an e-reader, a personal digital assistant (PDA), a server, a mainframe, a kiosk, a cable box, or any other computing hardware device. In one or more embodiments of the invention, the host computing device (105) corresponds to multiple hardware devices operatively connected using a network with wired and/or wireless segments. Although not explicitly shown in FIG. 1, the host computing device (105) includes one or more processors for executing the auxiliary application(s) (107, 109) and the emulator (110).

In one or more embodiments of the invention, the auxiliary applications (107, 109) are computer programs executing on the processor(s) of the host computing device (105). The auxiliary application(s) (107, 109) may correspond to any type of software application including word processing applications, financial management/accounting applications, media development software, firmware, operating systems, etc. In one or more embodiments of the invention, the auxiliary application(s) execute in parallel with the emulator (110).

In one or more embodiments of the invention, the emulator (110) is a software application that emulates (i.e., mimics, re-creates, duplicates, etc.) the functions, environment, and/or behavior of the NCE in the host computing device (105). In other words, the NCE is different from the host computing device (105) and code written for the NCE might not be executable on or compatible with the host computing device (105). However, the emulator (110) is configured to emulate the NCE and code written for the NCE may be executed by the emulator within the emulation of the NCE.

In one or more embodiments of the invention, the code segment (112) is written for the NCE. Moreover, the code segment (112) is to be executed by the emulator (110) within an emulation of the NCE (e.g., in order to test/verify the code segment (112), because the traditional hardware associated with the NCE is not available, etc.). The code segment (112) may be of any size and have any number of instructions. Moreover, the code segment (112) may have any number of loops. In general, each instruction within the code segment (112) may be classified as a time sensitive (TS) instruction or a time neutral (TN) instruction. In one or more embodiments of the invention, any instruction that is not classified as time sensitive is considered time neutral.

In one or more embodiments of the invention, the emulator (110) executes multiple instances of the same instruction. For example, if an instruction is located within a loop, the emulator (110) may execute the instruction during each iteration of the loop. As another example, there may be instances of an instruction both inside and outside the loop. Even if there is no loop in the code segment (112), multiple instances of the instruction may still be present in the code segment (e.g., one instance at the start of the code segment (112), one instance at the end of the code segment (112), etc.). It may be necessary, in some portions of the code segment (112), for the executions of consecutive instances of an instruction by the emulator to be spaced by at least an expected time. The expected time is the spacing that exists within the NCE between the execution of consecutive instances of the instruction. This spacing may be the result of the computational speed of the NCE. The emulator (110) may maintain this spacing, for example, to perform a more thorough test/verification of the code segment (112), to provide a user/hardware device with sufficient time to respond to a prompt (e.g., in the case of an I/O instruction), etc. In one or more embodiments of the invention, it is this requirement, in at least one portion of the code segment, that renders the instruction time sensitive.

For example, a loop may be a portion of the code segment (112) during which the executions of consecutive instances of a time sensitive instruction must be spaced by an expected time. Accordingly, the multiple instances of the time sensitive instruction that result from the multiple iterations of the loop are subject to the expected time spacing requirement. However, any instance of the time sensitive instruction outside the loop (i.e., in other portions of the code segment (112)) is not subject to the spacing requirement.

In one or more embodiments of the invention, the emulator (110) includes a timing repository (120). The timing repository (120) may be a database, a flat file, a lookup table, a queue, a linked list, or any type of data structure. In one or more embodiments of the invention, the TS instructions within the code segment (112) are administratively displaced with hook instructions before execution of the code segment (112) by the emulator (110). The administratively displaced TS instructions may be stored in the timing repository (120). The timing repository (120) may be accessed by the emulator (110) in response to encountering a hook instruction during the execution of the code segment (112). In other words, the hook instruction triggers the emulator (110) to access the timing repository (120) and retrieve the corresponding stored TS instruction. In one or more embodiments of the invention, the hook instruction includes a field with an offset or index corresponding to the entry in the timing repository (120) where the corresponding TS instruction is stored. The TS instructions in the code segment (112) may be administratively displaced with hook instructions and stored in the timing repository (120) by a user prior to the emulation of the NCE.

In one or more embodiments of the invention, the timing repository (120) stores the expected time for a TS instruction. As discussed above, the expected time corresponds to the spacing requirement between the executions of consecutive instances of the TS instruction in some portions of the code segment (112). In other words, in addition to storing TS instructions, the timing repository (120) may also have entries storing expected times (e.g., in microseconds, nanoseconds, clock cycles, etc.) for each TS instruction.

In one or more embodiments of the invention, the timing repository (120) stores the cycle count (i.e., the number of cycles) needed to execute one or more TN instructions within the NCE. In other words, the timing repository (120) may have multiple entries corresponding to multiple TN instructions, and each entry stores the cycle count of a TN instruction.

In one or more embodiments of the invention, the emulator (110) includes a window manager (114). The window manager (114) initiates/establishes instruction sequence windows in response to the identification of TS instructions within the code segment (112) during emulation. An instruction sequence window (ISW) is a time interval having a predefined length specified in instructions (e.g., 3 instructions, 10 instructions, 27 instructions, etc). The length of the ISW depends on the TS instruction. In other words, different TS instructions may trigger ISWs of different lengths. The predefined length of the ISW for each TS instruction may be set by a user prior to emulation of the NCE.

In one or more embodiments of the invention, the window manager (114) has software counters that start at the predefined lengths and decrement each time an instruction within the code segment (112) is executed by the emulator (110). The ISW expires/ends when its counter reaches zero. In one or more embodiments of the invention, the window manager (114) has software counters that start at zero and increment each time an instruction within the code segment (112) is executed by the emulator (110). The ISW expires/ends when its counter reaches the predefined length.

In one or more embodiments of the invention, the emulator (110) includes a timing engine (118). The timing engine (118) may be configured to calculate an aggregated delay for insertion into the emulation to maintain the expected times associated with TS instructions (discussed below). In one or more embodiments of the invention, the timing engine (118) is configured to generate a timestamp for each instance of a TS instruction encountered within the code segment (112) during emulation. In one or more embodiments of the invention, the timing engine (118) maintains a running total cycle count for all TN instructions between consecutive instances of a TS instruction within the code segment (112) (discussed below). The running total cycle count corresponds to the number of cycles needed, within the NCE, to execute at least the TN instructions between consecutive instances of the TS instruction.

Although embodiments of the invention have focused on the emulator (110) having a window manager (114), a timing engine (118), and a time repository (120), in other embodiments of the invention, the features/functionality of the emulator (110) may be implemented by and partitioned across different modules/engines.

Figure 2:
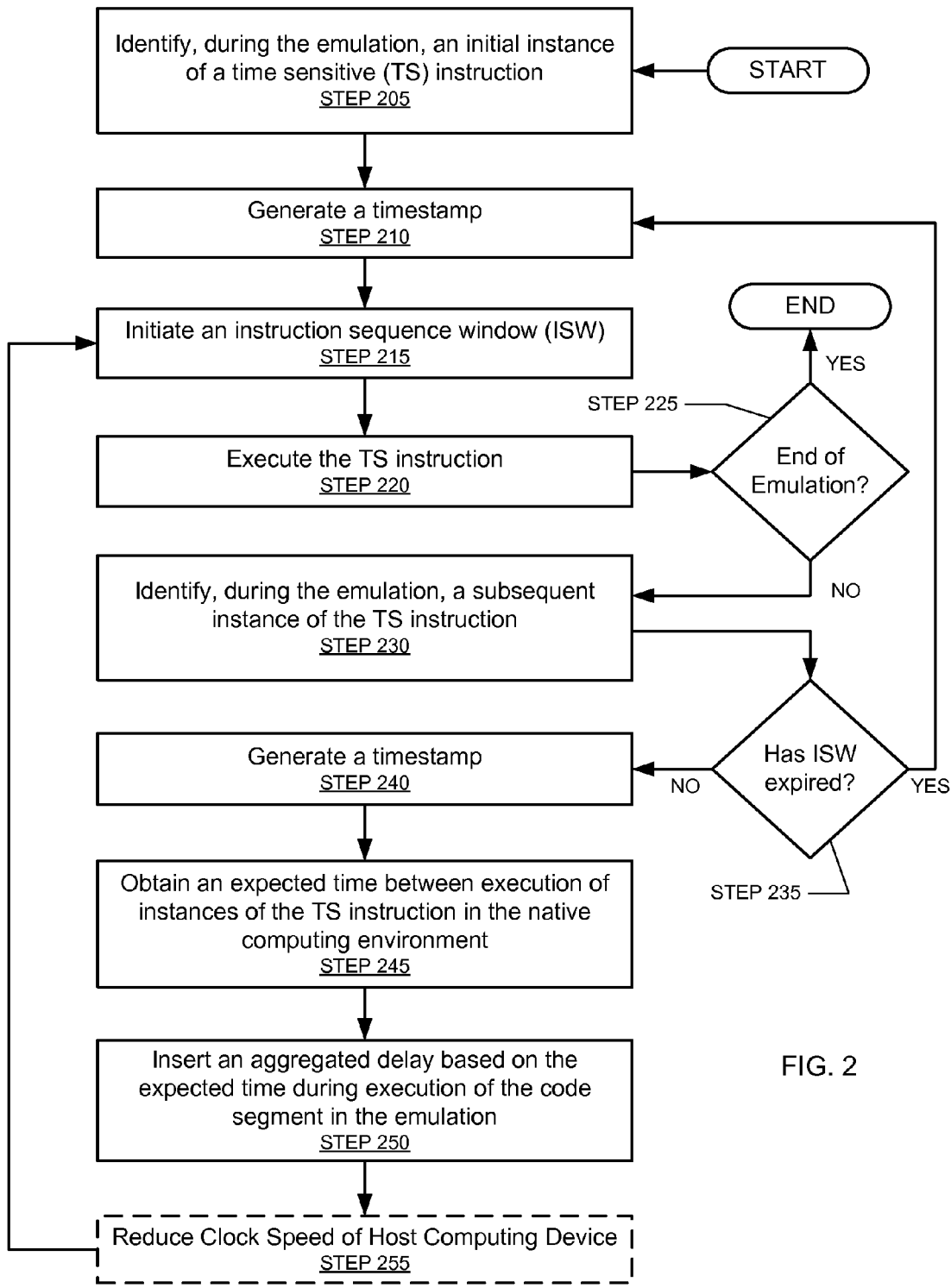
FIG. 2 and FIG. 3 show flowcharts in accordance with one or more embodiments of the invention.

FIG. 2 shows a flowchart for time correction during an emulation of a NCE in accordance with one or more embodiments of the invention. One or more steps in FIG. 2 may be executed by components of the system (100) (discussed above in reference to FIG. 1). The sequence of steps shown in FIG. 2 may differ among embodiments of the invention, and one or more of the steps may be performed in parallel and/or may be optional. Moreover, one or more steps in FIG. 2 may be repeated. Accordingly, the scope of the invention should not be considered limited to the specific arrangement of steps shown in FIG. 2.

Initially, a code segment written for the NCE is obtained (not shown). As discussed above, the code segment may be obtained by an emulator running on a host computing device. The host computing device makes use of the emulator to emulate the NCE and execute the code segment.

In STEP 205, an initial instance of a TS instruction associated with the code segment is identified by the emulator. In one or more embodiments of the invention, the TS instructions in the code segment are administratively displaced with hook instructions and stored in a data structure before execution of the code segment by the emulator. Upon encountering a hook instruction, the emulator retrieves the corresponding TS instruction from storage. Accordingly, identifying the initial instance of the TS instruction may include encountering a hook instruction corresponding to the TS instruction. In one or more embodiments of the invention, each hook instruction includes a field storing an offset or index. The offset or index may correspond to the entry in the data structure where the corresponding TS instruction is stored. In one or more embodiments of the invention, the TS instruction (i.e., hook instruction) is located within a loop of the code segment. In such embodiments, the TS instruction is initially identified during the first iteration of the loop.

In STEP 210, a timestamp is generated by the emulator. Specifically, the timestamp is generated in response to identifying the TS instruction. The timestamp may record the time on the host computing device when the TS instruction was identified. In other embodiments of the invention, the timestamp records the time on the host computing device immediately following execution of the TS instruction by the emulator.

In STEP 215, an instruction sequence window (ISW) is initialized/generated by the emulator. Specifically, the ISW is generated in response to identifying the TS instruction. The ISW has a predefined length specified in instructions (e.g., 3 instructions, 10 instructions, 27 instructions, etc). The length of the ISW depends on the TS instruction. In other words, different TS instructions may trigger ISWs of different lengths. In one or more embodiments of the invention, the ISW corresponds to a software counter that starts at the predefined length and decrements each time an instruction in the code segment is executed by the emulator. In one or more embodiments of the invention, the ISW corresponds to a software counter that starts at zero and increments each time an instruction within the code segment is executed by the emulator. The length of the ISW may be set by the user prior to execution of the code segment by the emulator. If the TS instruction is located within a loop, the length of the corresponding ISW may be set to the number of instructions in the loop plus an offset (e.g., +2 instructions, +5 instructions, etc.) The ISW initialized is STEP 215 may replace any existing ISW for the TS instruction.

In STEP 220, the TS instruction is executed within the emulation of the NCE. As discussed above, in other embodiments of the invention, STEP 220 may occur before STEP 210 and/or before STEP 215. Following execution of the TS instruction, it is determined whether the emulation is complete (STEP 225). When it is determined that the emulation is complete (i.e., the entire code segment has been executed), the process ends. However, when it is determined that the emulation is not complete, the process proceeds to STEP 230. In one or more embodiments of the invention, STEP 225 is omitted. In such embodiments, the process proceeds from STEP 220 to STEP 230.

In STEP 230, a second or subsequent instance of the TS instruction is identified within the code segment. As discussed above in reference to STEP 205, the TS instructions in the code segment may be administratively displaced with hook instructions and stored in a data structure before execution of the code segment by the emulator. Accordingly, identifying the second or subsequent instance of the TS instruction may include encountering a hook instruction corresponding to the TS instruction. As also discussed above in reference to STEP 205, the TS instruction (i.e., hook instruction) may be located within a loop of the code segment. This second or subsequent instance of the TS instruction may be identified during a second or subsequent iteration of the loop.

In STEP 235, it is determined whether the ISW established in STEP 215 has expired. When it is determined that the time window has expired (e.g., the counter implementing the ISW has already decremented zero and/or already incremented to the predefined length of the ISW), the process returns to STEP 210. However, when it is determined that the ISW has not yet expired, the process proceeds to STEP 240.

Those skilled in the art, having the benefit of this detailed description, will appreciate that the instances of the TS instruction (i.e., hook instructions) may be separated by one or more TN instructions within the code segment. In other words, one or more TN instructions may be executed during the emulation between STEP 205 and STEP 230. Moreover, in the case of the TS instruction being located within a loop, these TN instructions may be located within the same loop.

In STEP 240, a timestamp is generated by the emulator. Specifically, the timestamp is generated in response to identifying the subsequent instance of the TS instruction. STEP 240 may be essentially the same as STEP 210. In other words, the timestamp may record the time on the host computing device when second or subsequent instance of the TS instruction is identified.

In STEP 245, the expected time between the executions of consecutive instances of the TS instruction within the NCE is obtained. The expected time may be obtained from a data structure (e.g., timing repository (120)). The expected time may be calculated using any method. For example, the expected time may be calculated using the process described in FIG. 3 (discussed below).

In one or more embodiments of the invention, the difference between the timestamps (i.e., STEP 240 and STEP 210) corresponds to the time period between the executions of consecutive instances of the TS instruction within the emulation. The host computing device running the emulator is computationally faster than the NCE. As a result, the expected time obtained in STEP 245 is greater than the difference between the timestamps. In order to maintain the expected time requirement, the emulation time needs to be corrected.

In STEP 250, an aggregated delay is inserted during execution of the code segment. The insertion of the aggregated delay may effectively correct the emulation time (i.e., maintain the expected time requirements). The aggregated delay is based on the expected time. For example, the aggregated delay may be a difference between the expected time and the time period between the timestamps. In one or more embodiments of the invention, the aggregated delay is inserted before execution of the subsequent instance of the TS instruction.

In STEP 255, the clock speed of the host computing device is reduced. This effectively slows down execution of the code segment by the emulator. The clock speed may be reduced for the duration of any ISW. By reducing the clock speed, the difference between the expected time and the time period between timestamps is reduced. The result is a smaller amount of correction and thus a smaller amount of aggregated delay to maintain the expected time requirements. Those skilled in the art, having the benefit of this detailed description, will appreciate that STEP 255 is optional.

As discussed above, the host computing device includes one or more processors. In one or more embodiments of the invention, during an ISW established in response to identifying a subsequent instance of the TS instruction, use of the one or more processors may be diverted away from the emulator and made available to auxiliary applications also running on the host computing device. During this diversion period, the number of instructions in the code segment that can be executed by the emulator is reduced. The result is a smaller difference between the expected time and the time period between timestamps, and thus a smaller amount of aggregated delay needed for insertion to maintain the expected time requirements.

As also discussed above, an instruction is deemed time sensitive if there exists at least one portion of the code segment where the executions of consecutive instances of the instruction by the emulator need to be spaced by at least an expected time. For example, a loop may correspond to such a portion of the code segment. However, other portions of the code segment (e.g., portions of the code segment outside the loop) may not have the expected time spacing requirement. By properly setting the length of the ISW, the ISW will be initialized/re-initialized when the TS instruction is identified during the first, second, third, . . . , and final iteration of the loop (i.e., the portion of the code segment requiring the spacing). However, the ISW will expire before the instruction instance that exists outside the loop (i.e., a portion of the code segment that does not require the spacing) is encountered. In other words, STEP 235 will evaluate to "TRUE/YES" for the instance of the TS instruction that is outside the loop, properly preventing the triggering of emulation time correction (e.g., STEP 245, STEP 250, and STEP 250).

The process of FIG. 2 has been described with a heavy focus on the use of hook instructions substituted for TS instructions within the code segment. Specifically, in many of the described embodiments, the hook instructions act as a trigger for the initialization of ISWs (e.g., STEP 215), the creation of time stamps (e.g., STEP 210), checking the status of the ISW (e.g., STEP 235), the calculation and insertion of aggregate delay (e.g., STEP 250), etc. In one or more embodiments of the invention, instead of administratively modifying the code segment by adding hook instructions, the emulator instruction set (i.e., the emulator itself) is modified to perform one or more of the steps in FIG. 2. For example, prior to modification, the emulator is already configured to perform operation set A in response to TS instruction A and to perform operation set B in response to TS instruction B. Both operation set A and operation set B may be modified to include one or more of the steps in FIG. 2. In such embodiments of the invention, the code segment itself would not need to be modified.

Figure 3:
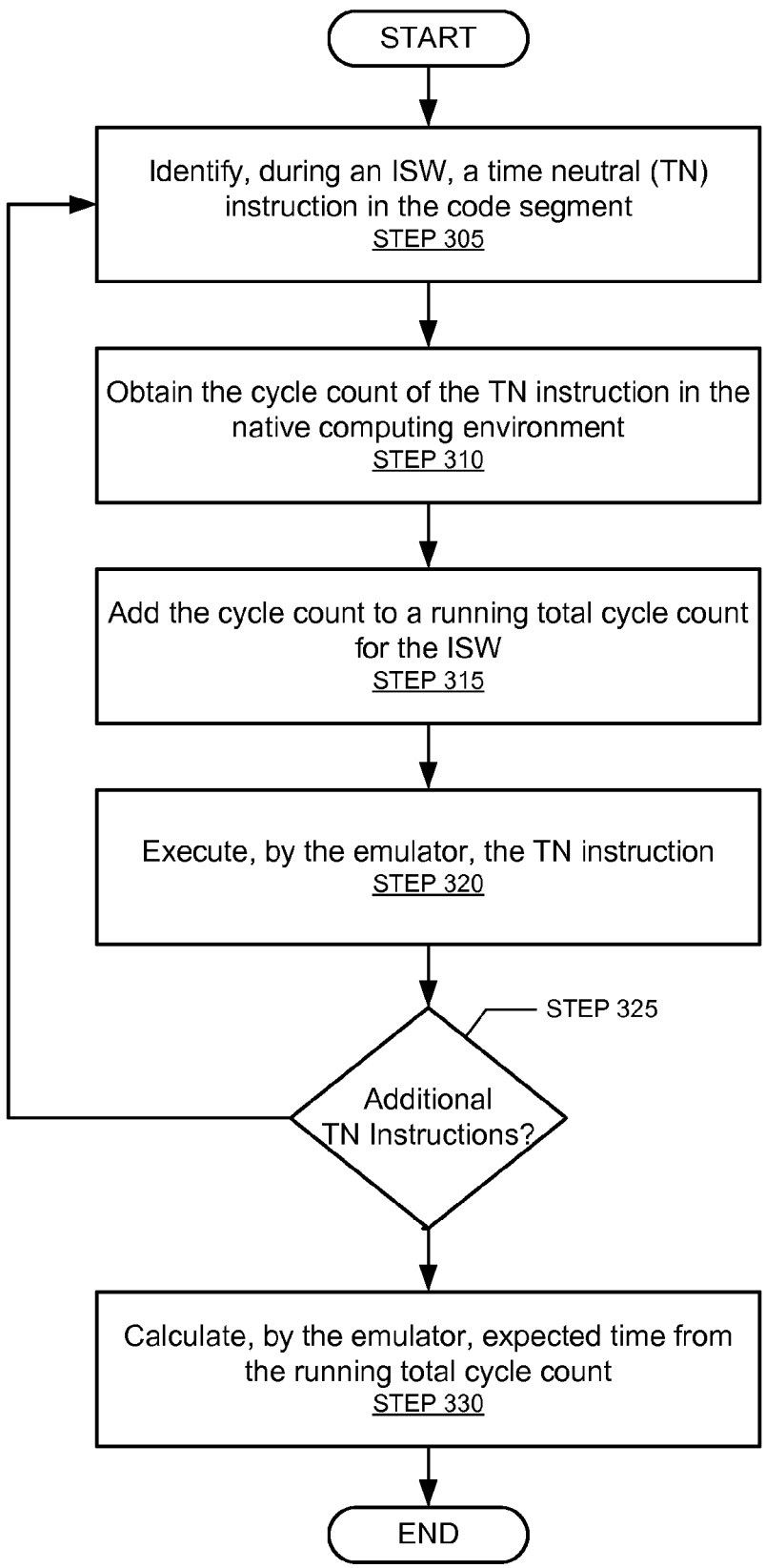

FIG. 3 shows a flowchart for obtaining an expected time in accordance with one or more embodiments of the invention. Accordingly, the process shown in FIG. 3 may correspond to STEP 245, discussed above in reference to FIG. 2. One or more steps in FIG. 3 may be executed by components of the system (100), discussed above in reference to FIG. 1. The sequence of steps shown in FIG. 3 may differ among embodiments of the invention, and one or more of the steps may be performed in parallel and/or may be optional. Moreover, one or more steps in FIG. 3 may be repeated. Accordingly, the scope of the invention should not be considered limited to the specific arrangement of steps shown in FIG. 3.

In one or more embodiments of the invention, the process shown in FIG. 3 is executed in between the executions of consecutive instances of a TS instruction. For example, the process shown in FIG. 3 may be executed in between STEP 220 and STEP 230, discussed above in reference to FIG. 2. Moreover, the process shown in FIG. 3 may be executed before an ISW (e.g., the ISW of STEP 215, discussed above in reference to FIG. 2) expires.

Initially, a TN instruction within the code segment is identified by the emulator (STEP 305). The TN instruction may follow another TN instruction within the code segment or may follow a TS instruction within the code segment. Moreover, the TN instruction may be identified during an ISW established in response to a TS instruction (discussed above in reference to STEP 215 of FIG. 2). In one or more embodiments of the invention, the TN instruction is located within a loop of the code segment.

In STEP 310, the cycle count of the TN instruction in the NCE is obtained (e.g., by the emulator). The cycle count of the TN instruction corresponds to the number of cycles within the NCE needed to execute the TN instruction. The cycle count of the TN instruction may be retrieved from a data structure (e.g., timing repository (120)) having an entry corresponding to the TN instruction and storing the cycle count.

In STEP 315, the obtained cycle count is added to a running total cycle count for the ISW. In other words, the existing running total cycle count may be incremented by the obtained cycle count. The running total cycle count may be set to zero at the initialization of the ISW.

In STEP 320, the TN instruction is executed by the emulator. In STEP 325, it is determined whether the instruction following the TN instruction identified in STEP 305 is also a time neutral instruction. When it is determined that the subsequent instruction is also a TN instruction, the process returns to STEP 305. Otherwise, the process proceeds to STEP 330.

In STEP 330 the expected time is calculated based on the running total cycle count and the computational speed (e.g., cycles per second) of the NCE. As discussed above, the expected time may be required to calculate the aggregate delay for insertion into the emulation. In one or more embodiments of the invention, STEP 310 and STEP 315 are omitted should the time window expire during execution of the process shown in FIG. 3.

Figure 4A:
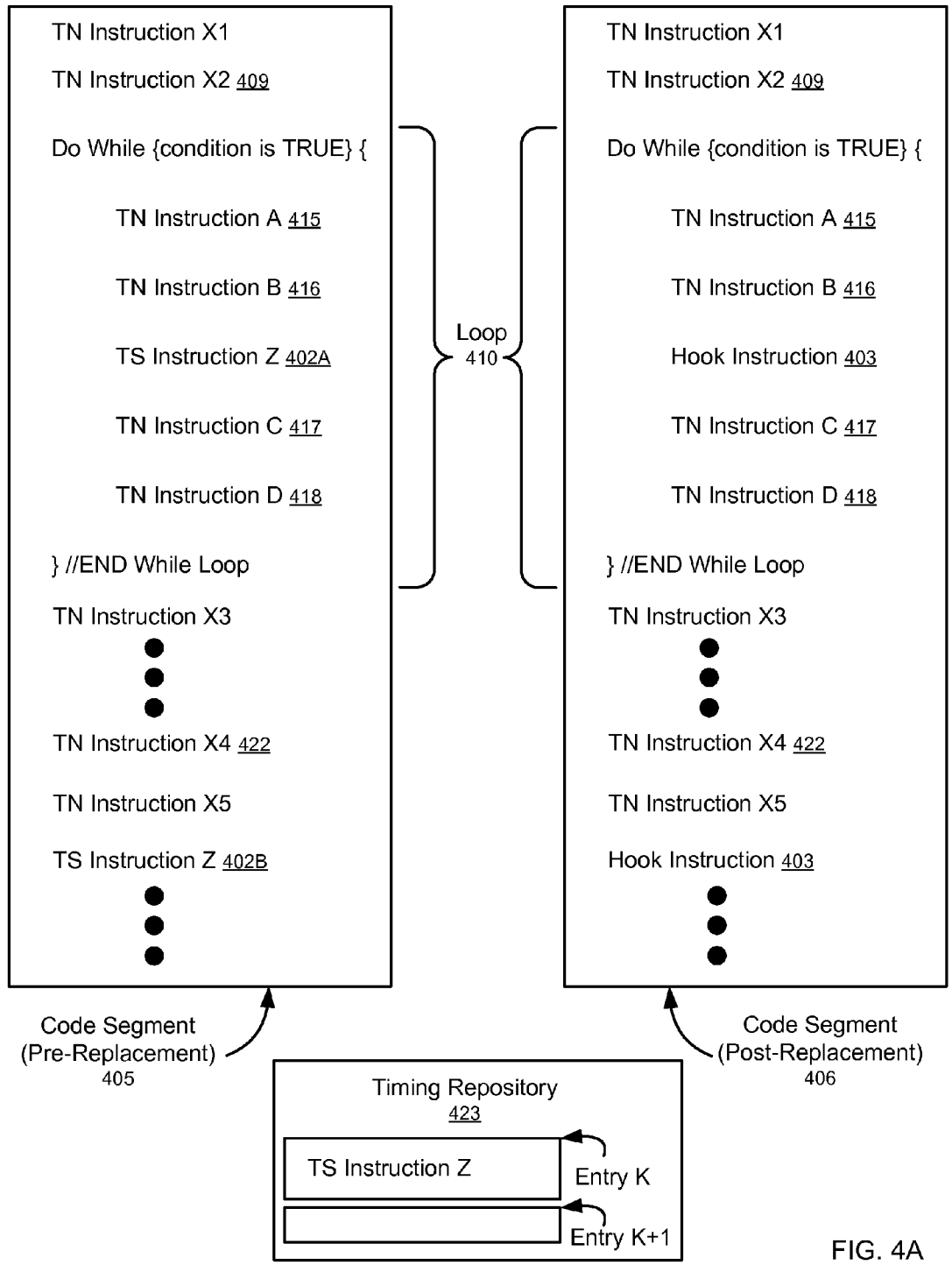
Figure 4C:
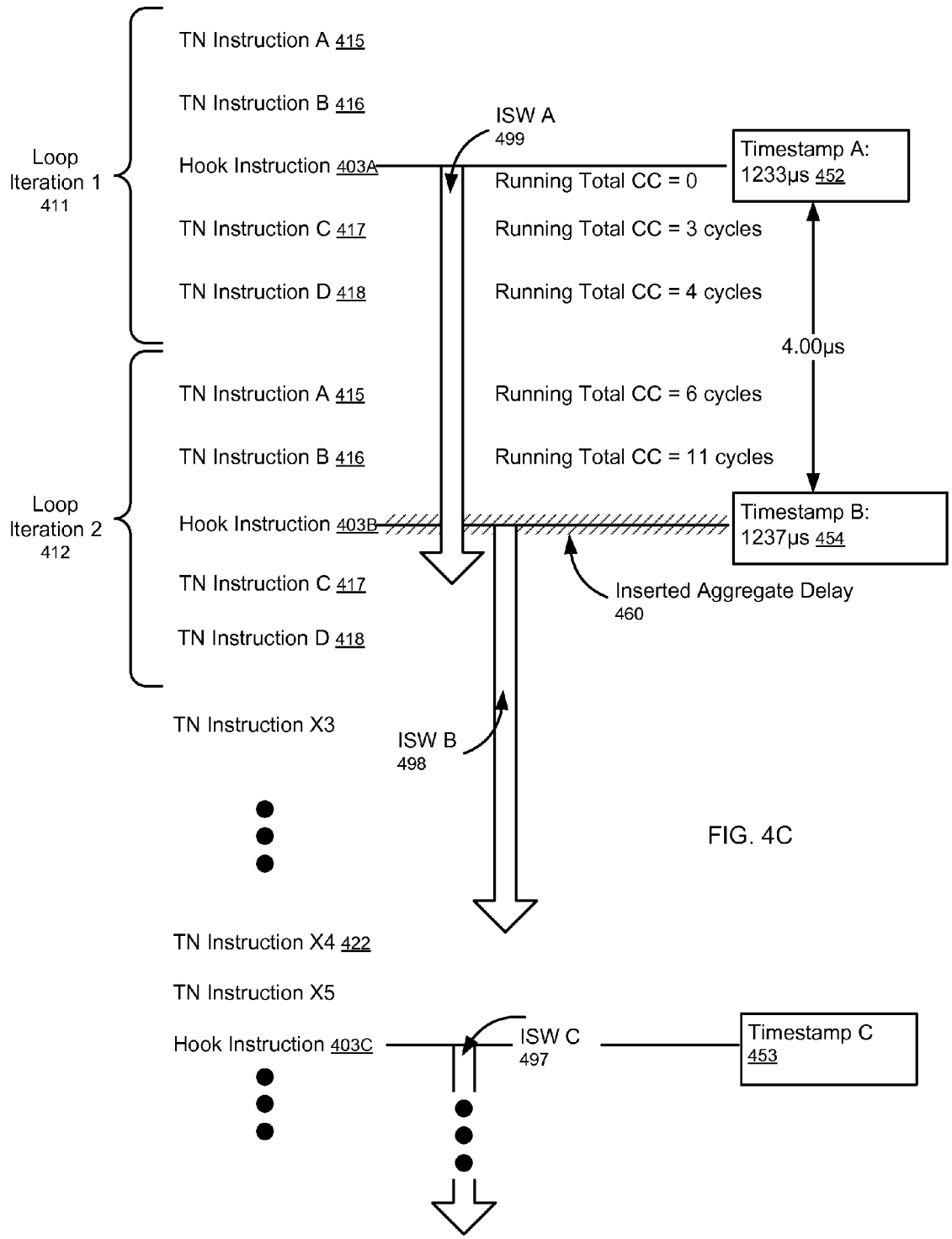

FIGS. 4A, 4B, and 4C show an example in accordance with one or more embodiments of the invention. As shown in FIG. 4A, there exists a code segment (405) having multiple TN instructions (e.g., TN Instruction X2 (409), TN Instruction A (415), TN Instruction X4 (422)). As also shown in FIG. 4A, there are two instances of TS Instruction Z within the code segment (405): TS Instruction Z (402A) within the loop (410); and TS Instruction Z (402B) outside the loop (410). In this example, assume that the code segment (405) is written for a NCE. Moreover, assume that the code segment (405) is to be executed using a host computing device that is different and computationally faster than the NCE. Accordingly, the host computing device makes use of an emulator to emulate the NCE and execute the code segment (405).

As discussed above, there are instances of TS Instruction Z (402A, 402B) both inside and outside the loop (410). In this example, assume the loop (410) is a portion of the code segment (405) during which the executions of consecutive instances of TS Instruction Z (402B) by the emulator are to be spaced by at least an expected time. Further, assume that the portions of the code segment (405) outside the loop (410) do not require the expected time spacing. It is due to the at least one portion of the code segment (405) that requires the expected time spacing that renders Instruction Z (402A, 402B) time sensitive.

Those skilled in the art, having the benefit of this detailed description, will appreciate that the loop instructions (TS Instruction Z (402A), TN Instruction A (415), TN Instruction B (416), TN Instruction C (417), TN Instruction D (418)) may be executed multiple times (i.e., once for each iteration of the loop (410)) during the execution of the code segment (405). Thus, the emulator will identify/encounter an instance of TS instruction Z (402A) during each iteration of the loop (410). For example, the emulator may identify a first instance and a second instance of TS instruction Z (402A) during a first iteration and a second iteration, respectively, of the loop (410).

Still referring to FIG. 4A, before execution of the code segment (405), all instances of TS Instruction Z (402A, 402B) are administratively displaced with a hook instruction. Moreover, TS Instruction Z is stored in the timing repository (423). As shown in FIG. 4A, the hook instruction (403) has administratively displaced both instances of TS Instruction Z (402A, 402B) in the code segment (406). The hook instruction (403) includes an offset corresponding to entry K in the timing repository (423) (i.e., the entry where TS Instruction Z is stored).

FIG. 4B shows a table (425) with the cycle counts for different TN instructions. For example, as shown in the table (425), 5 cycles in the NCE are needed to execute TN Instruction B. As another example, 1 cycle in the NCE is needed to execute TN Instruction D. The emulator has access to the cycle counts and can return the cycle counts (e.g., in response to a query) during the emulation of the NCE.

FIG. 4C shows two iterations of the loop (410): Loop Iteration 1 (411) and Loop Iteration 2 (412). During execution of the code segment (406) within the emulation of the NCE, the emulator will eventually encounter the loop (410). During loop iteration 1 (411), the hook instruction (403A) triggers the emulator to identify/retrieve the corresponding instruction (i.e., TS instruction Z) from the timing repository. In response to identifying/retrieving TS instruction Z, ISW A (499) will be initialized/established and timestamp A (452) will be generated. Moreover, displaced TS instruction Z will be executed. As discussed above, ISW A (499) is of a predefined length measured in instructions.

During loop iteration 2 (412), the hook instruction (403B) is once again identified/encountered by the emulator. In response, TS Instruction Z is identified/retrieved, timestamp B (454) is generated, ISW B (498) is initialized/established, and displaced TS Instruction Z is executed. Moreover, as this instance of TS instruction Z (i.e., Hook Instruction (403B)) is encountered before expiration of ISW A (499), the expected time between the executions of the first and second instances of TS instruction Z (i.e. Hook Instruction (403A), Hook Instruction (403B)) is obtained (discussed below).

In between execution of the first instance and the second instance of TS instruction Z (i.e., Hook Instruction (403A), Hook Instruction (403B)), the emulator identifies and executes TN Instruction C (417), TN Instruction D (418), TN Instruction A (415), and TN Instruction B (416) within the emulation of the NCE. Specifically, TN Instruction C (417) and TN Instruction D (418) are executed during loop iteration 1 (411) after the first instance of TS instruction Z (i.e., Hook Instruction (403A)) is identified and executed. In contrast, TN Instruction A (415) and TN Instruction B (416) are executing during loop iteration 2 (412) before the second instance of TS instruction Z (i.e., Hook Instruction (403B))) is identified and executed. In response to identifying a TN instruction (415, 416, 417, 418) during ISW A (499), the cycle count for the TN instruction is obtained from the timing repository (420) and added to a running total cycle count for ISW A (499).

For example, at the start of ISW A (499), the running total cycle count for ISW A (499) is 0 cycles. After identifying TN Instruction C (417) during loop iteration 1 (411), the running total cycle count is 3 cycles (i.e., the cycle count of TN Instruction C (417) added to the previous running total cycle count of 0 cycles). After identifying TN Instruction D (418) during loop iteration 1 (411), the running total is 4 cycles (i.e., the cycle count of TN Instruction D (418) added to the previous running total cycle count of 3 cycles). After identifying TN Instruction A (415) during loop iteration 2 (412), the running total cycle count is 6 cycles (i.e., the cycle count of TN Instruction A (415) added to the previous running total cycle count of 4 cycles). In this example, the running total cycle count for ISW A (499) is 11 cycles before the second instance of TS Instruction Z (i.e., Hook Instruction (403B)) is encountered. Assume that 11 cycles in the NCE correspond to 7.5 μs based on the computational speed (e.g., cycles per second) of the NCE.

As shown in FIG. 4C, the difference between timestamp B (454) and timestamp A (452) is 4.00 μs. In other words, the emulator operating on the host computing device executed the TN instructions between consecutive instances of TS instruction Z in 4.00 μs. This is 3.50 μs faster than the expected time of 7.50 μs in the NCE. Accordingly, an aggregated delay (460) of 3.50 μs is inserted into the emulation before execution of the second instance of TS instruction Z (i.e., Hook Instruction (403B)) to correct the emulation time (i.e., maintain the expected time spacing requirement). This process may be repeated for each iteration of the loop (410). Moreover, the clock speed of the host computing system may be reduced for one or more subsequent ISWs in order to reduce the emulation time correction needed (i.e., the aggregated delay needed) in the subsequent iterations of the loop (410).

As shown in FIG. 4C, ISW B (498) expires before the third instance of TS Instruction Z (i.e., Hook Instruction Z (403C)) is identified/encountered by the emulator. As discussed above, the third instance of TS Instruction Z is outside the loop (410) and thus outside the portion of the code segment (405) that has the expected time spacing requirements. Accordingly, when the third instance of TS Instruction Z (i.e., Hook Instruction (403C)) is identified/encountered by the emulator, Timestamp C (453) will be generated and ISW C (497) will be initialized/established. However, unlike the second instance of TS Instruction Z (i.e., Hook Instruction Z (403B)), there will be no calculation and no insertion of aggregated delay.

Embodiments of the invention may have one or more of the following advantages: the ability for selective compensation of emulated instruction execution such that the rate of emulated execution accurately equals that of said code within its native computing environment; the ability to preserve native dynamics within execution speed sensitive code while allowing the balance of code to benefit from typically increased emulation speed of the host computing device; the ability to preserve native execution timing without modifying the emulated code to achieve this result; the use of minimal additional/memory storage to identify instructions which are to be time compensated; the minimal execution speed impact to emulator when executing instructions which are not to be compensated; etc.

Figure 5:
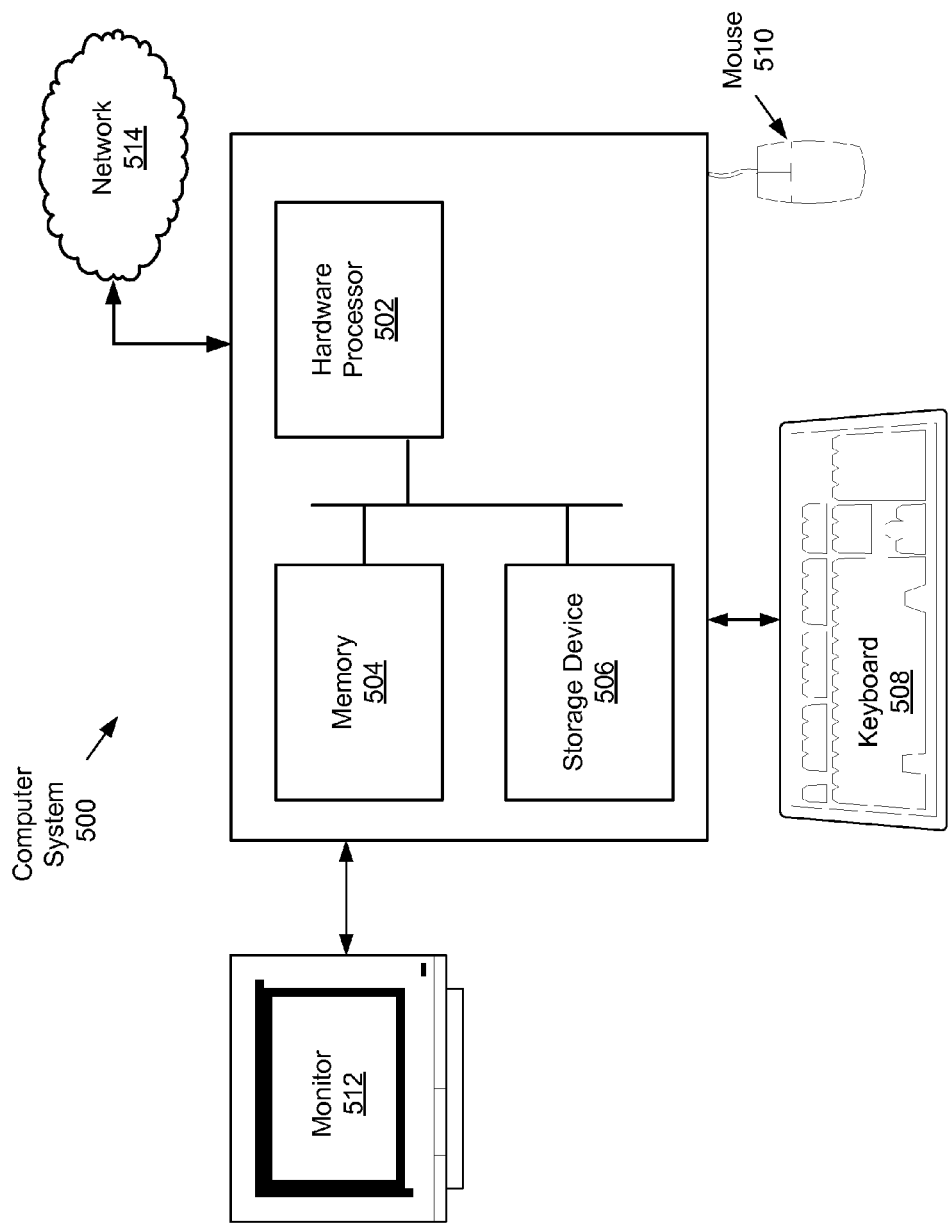
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), an associated memory (504) (e.g. random access memory (RAM), cache memory, flash memory, etc.), a storage device (506) (e.g. a hard disk, an optical drive such as a compact disk drive or digital video disk (DVD) drive, a flash memory stick, etc.), and numerous other elements and functionalities typical of today's computers (not shown). In one or more embodiments of the invention, the processor (502) is hardware. For example, the processor may be an integrated circuit. The computer system (500) may also include input means, such as a keyboard (508), a mouse (510), or a microphone (not shown). Further, the computer system (500) may include output means, such as a monitor (512) (e.g. a liquid crystal display (LCD), a plasma display, or cathode ray tube (CRT) monitor). The computer system (500) may be connected to a network (514) (e.g. a local area network (LAN), a wide area network (WAN) such as the Internet, or any other type of network) via a network interface connection (not shown). In one or more embodiments of the invention, many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g. the hardware device, the image processing device, the computing device) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for time correction during an emulation of a native computing environment (NCE), comprising:
   obtaining, by an emulator, a code segment for execution within the NCE;
   identifying, by the emulator and during an execution of the code segment within the emulation, a first instance of a time sensitive (TS) instruction;
   initiating, by the emulator, a first instruction sequence window (ISW) in response to identifying the first instance of the TS instruction, wherein the first ISW has a predefined length specified in instructions;
   identifying, by the emulator and during the execution of the code segment within the emulation, a second instance of the TS instruction before expiration of the first ISW;
   obtaining, by the emulator and in response to identifying the second instance before expiration of the first ISW, an expected time between execution of the first instance and the second instance of the TS instruction in the NCE; and
   inserting, by the emulator, an aggregated time delay based on the expected time into the emulation.

2. The method of claim 1, further comprising:
   displacing, before the execution of the code segment, the TS instruction with a hook instruction;
   storing, before the execution of the code segment, the TS instruction in a timing repository; and
   encountering, by the emulator, the hook instruction during the execution of the code segment,
   wherein the first instance of the TS instruction is identified in response to encountering the hook instruction.

3. The method of claim 2, further comprising:
   identifying, in response to encountering the hook instruction, an index in the hook instruction; and
   accessing the timing repository based on the index to retrieve the first TS instruction.

4. The method of claim 1, further comprising:
   generating a first timestamp in response to identifying the first instance of the TS instruction;
   generating a second timestamp in response to identifying the second instance of the TS instruction; and
   calculating an elapsed time between the first timestamp and the second timestamp,
   wherein the aggregated time delay is further based on a difference between the expected time and the elapsed time.

5. The method of claim 4, wherein obtaining the expected time comprises:
   identifying, during the execution, a first time neutral (TN) instruction in the code segment during the first ISW;
   obtaining, by the emulator, a first cycle count of the first TN instruction in the NCE;
   adding, by the emulator, the first cycle count to a running total cycle count;
   identifying, during the execution, a second TN instruction in the code segment during the first ISW;
   obtaining, by the emulator, a second cycle count of the second TN instruction in the NCE; and
   adding the second cycle count to the running total cycle count,
   wherein the expected time is based on the running total cycle count.

6. The method of claim 5, wherein the TS instruction, the first TN instruction, and the second TN instruction are located within a loop in the code segment.

7. The method of claim 4, wherein obtaining the expected time comprises:
   accessing, based on the TS instruction, a timing repository storing the expected time.

8. The method of claim 1, further comprising:
   initiating a second ISW in response to identifying the second instance of the TS instruction; and
   reducing, during a portion of the ISW, a clock speed of a host computing device executing the emulator.

9. The method of claim 1, further comprising:
initiating a second ISW in response to identifying the second instance of the TS instruction; and
diverting, by a host computing device executing the emulator on a processor, use of the processor away from the emulator and to an auxiliary application for a portion of the second time window.

10. A non-transitory computer readable medium (CRM) storing instructions for time correction during an emulation of a native computing environment (NCE), the instructions comprising functionality for:
obtaining, by an emulator, a code segment for execution within the NCE;
identifying, by the emulator and during an execution of the code segment within the emulation, a first instance of a time sensitive (TS) instruction;
initiating, by the emulator, a first instruction sequence window (ISW) in response to identifying the first instance of the TS instruction, wherein the first ISW has a predefined length specified in instructions;
identifying, by the emulator and during the execution of the code segment within the emulation, a second instance of the TS instruction before expiration of the first ISW;
obtaining, by the emulator and in response to identifying the second instance before expiration of the first ISW, an expected time between execution of the first instance and the second instance of the TS instruction in the NCE; and
inserting, by the emulator, an aggregated time delay based on the expected time into the emulation.

11. The non-transitory CRM of claim 10, the instructions further comprising functionality for:
storing, before the execution of the code segment, the TS instruction in a timing repository,
wherein the TS instruction in the code segment is displaced with a hook instruction before the execution of the code segment;
encountering, using the emulator, the hook instruction corresponding to the TS instruction during the execution of the code segment; and
retrieving, in response to encountering the hook instruction, the first TS instruction from the timing repository.

12. The non-transitory CRM of claim 10, the instructions further comprising functionality for:
generating a first timestamp in response to identifying the first instance of the TS instruction;
generating a second timestamp in response to identifying the second instance of the TS instruction; and
calculating an elapsed time between the first timestamp and the second timestamp,
wherein the aggregated time delay is further based on a difference between the expected time and the elapsed time.

13. The non-transitory CRM of claim 12, wherein the instructions for obtaining the expected time comprise functionality for:
identifying a first time neutral (TN) instruction in the code segment during the first ISW;
obtaining a first cycle count of the first TN instruction in the NCE;
adding the first cycle count to a running total cycle count;
identifying a second TN instruction in the code segment during the first ISW;
obtaining a second cycle count of the second TN instruction in the NCE; and
adding the second cycle count to the running total cycle count,
wherein the expected time is based on the running total cycle count.

14. The non-transitory CRM of claim 10, the instructions further comprising functionality for:
initiating a second ISW in response to identifying the second instance of the TS instruction; and
reducing a clock speed of a host computing device executing the emulator during the second ISW.

15. A system for time correction during an emulation of a native computing environment (NCE), comprising:
a processor;
a code segment for execution within the NCE and comprising a time sensitive (TS) instruction, a first time neutral (TN) instruction, and a second TN instruction;
a window manager configured to:
initiate a first instruction sequence window (ISW) in response to identifying a first instance of the TS instruction during an execution of the code segment within the emulation, wherein the first ISW has a predefined length specified in instructions; and
initiate a second ISW in response to identifying a second instance of the TS instruction during the execution of the code segment within the emulation, wherein the second instance is identified before expiration of the first ISW; and
a timing engine, executing on the processor, and configured to:
obtain, in response to identifying the second instance of the TS instruction before expiration of the first ISW, an expected time between execution of the first instance of the TS instruction and the second instance of the TS instruction in the NCE; and
insert an aggregated time delay based on the expected time into the emulation.

16. The system of claim 15, further comprising:
a timing repository storing the TS instruction,
wherein the TS instruction in the code segment is displaced with a hook instruction before the execution of the code segment.

17. The system of claim 15, wherein the timing engine is further configured to:
generate a first timestamp in response to identifying the first instance of the TS instruction;
generate a second timestamp in response to identifying the second instance of the TS instruction; and
calculate an elapsed time between the first timestamp and the second timestamp,
wherein the aggregated time delay is further based on a difference between the expected time and the elapsed time.

18. The system of claim 17, wherein the timing engine is further configured to:
add a first cycle count corresponding to the first TN instruction to a running total cycle count; and
add a second cycle count corresponding to the second TN instruction to the running total cycle count,
wherein the expected time is based on the running total cycle count.

19. The system of claim 15, further comprising:
a clock having a speed, wherein the speed is reduced for a portion of the second ISW during the execution of the code segment.

20. The system of claim 15, further comprising:
an auxiliary application, wherein use of the processor is diverted from the timing engine to the auxiliary application for a portion of the second ISW.

* * * * *